US012643303B2

(12) United States Patent
Lorenzi et al.

(10) Patent No.: US 12,643,303 B2
(45) Date of Patent: Jun. 2, 2026

(54) EMBOSSING DEVICE WITH AT LEAST ONE HEATED EMBOSSING ROLLER, AND METHOD

(71) Applicant: Valmet Tissue Converting S.p.A., Lucca (IT)

(72) Inventors: Fabrizio Lorenzi, Lucca (IT); Leonardo Boschi, Lucca (IT)

(73) Assignee: Valmet Tissue Converting S.p.A., Lucca (IT)

( * ) Notice: Subject to any disclaimer, the term of this patent is extended or adjusted under 35 U.S.C. 154(b) by 187 days.

(21) Appl. No.: 18/576,553

(22) PCT Filed: Jul. 1, 2022

(86) PCT No.: PCT/EP2022/068320
§ 371 (c)(1),
(2) Date: Jan. 4, 2024

(87) PCT Pub. No.: WO2023/280722
PCT Pub. Date: Jan. 12, 2023

(65) Prior Publication Data

US 2024/0308169 A1 Sep. 19, 2024

(30) Foreign Application Priority Data

Jul. 5, 2021 (IT) ........................ 102021000017675

(51) Int. Cl.
*B31F 1/07* (2006.01)

(52) U.S. Cl.
CPC ........ *B31F 1/07* (2013.01); *B31F 2201/0715* (2013.01); *B31F 2201/0753* (2013.01); *B31F 2201/0764* (2013.01); *B31F 2201/0766* (2013.01); *B31F 2201/0771* (2013.01); *B31F 2201/0787* (2013.01); *B31F 2201/0789* (2013.01)

(58) Field of Classification Search
None
See application file for complete search history.

(56) References Cited

U.S. PATENT DOCUMENTS 3,556,907 A 1/1971 Nystrand
4,252,184 A 2/1981 Appel
(Continued)

FOREIGN PATENT DOCUMENTS

EP 1075387 B1 11/2003
EP 1187716 B1 3/2004
(Continued)

*Primary Examiner* — Barbara J Musser
(74) *Attorney, Agent, or Firm* — Breiner & Breiner, L.L.C.

(57) ABSTRACT

The embossing device includes—a first path for a first ply of web material; —along the first path, a first embossing roller provided with embossing protrusions; —a first heating device associated with the first embossing roller to heat the surface of the first embossing roller; —at least a first functional roller adapted to perform an action on a ply of web material. The first functional roller is provided with a rotation arrangement, adapted to keep the first functional roller in rotation during a temporary stoppage of the embossing device, with the first functional roller spaced from the first embossing roller and with the first ply of web material stationary in the first path.

33 Claims, 6 Drawing Sheets

(56) References Cited

U.S. PATENT DOCUMENTS

| | | | | |
|---|---|---|---|---|
| 5,294,475 | A | 3/1994 | McNeil | |
| 6,746,558 | B2 | 6/2004 | Hoeft et al. | |
| 2013/0220151 | A1 | 8/2013 | Sauter et al. | |
| 2023/0129474 | A1 * | 4/2023 | Frasnetti ................ | H05B 6/365<br>264/403 |

FOREIGN PATENT DOCUMENTS

| | | | |
|---|---|---|---|
| EP | 1239079 | B1 | 6/2007 |
| EP | 1319748 | B1 | 4/2008 |
| EP | 1855876 | B1 | 2/2012 |
| EP | 3747644 | B1 | 8/2023 |
| IT | 101995900446040 | | 12/1996 |
| IT | 102018000002624 | A1 | 8/2019 |
| JP | 6-333536 | B2 | 2/1994 |
| JP | 2007-136861 | A | 7/2007 |
| WO | 2018229676 | A1 | 12/2018 |

* cited by examiner

Fig. 7
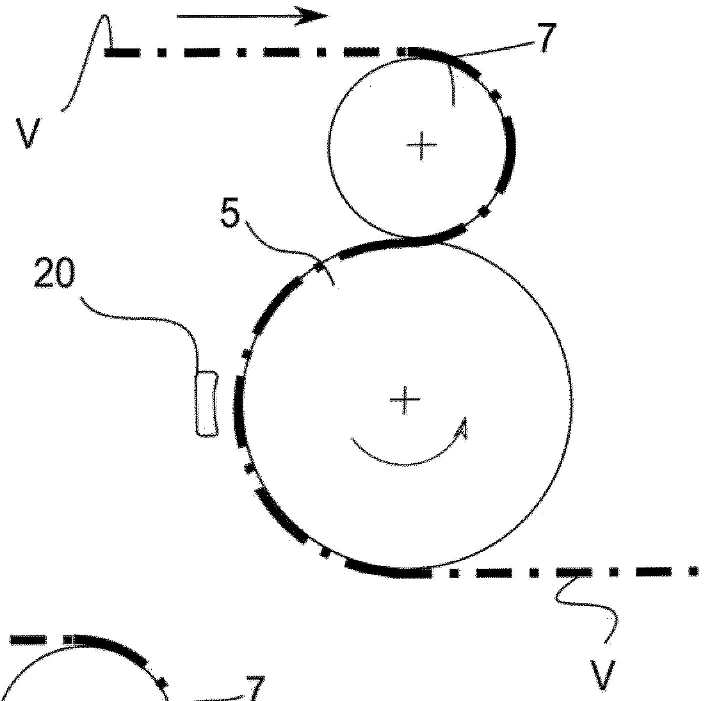
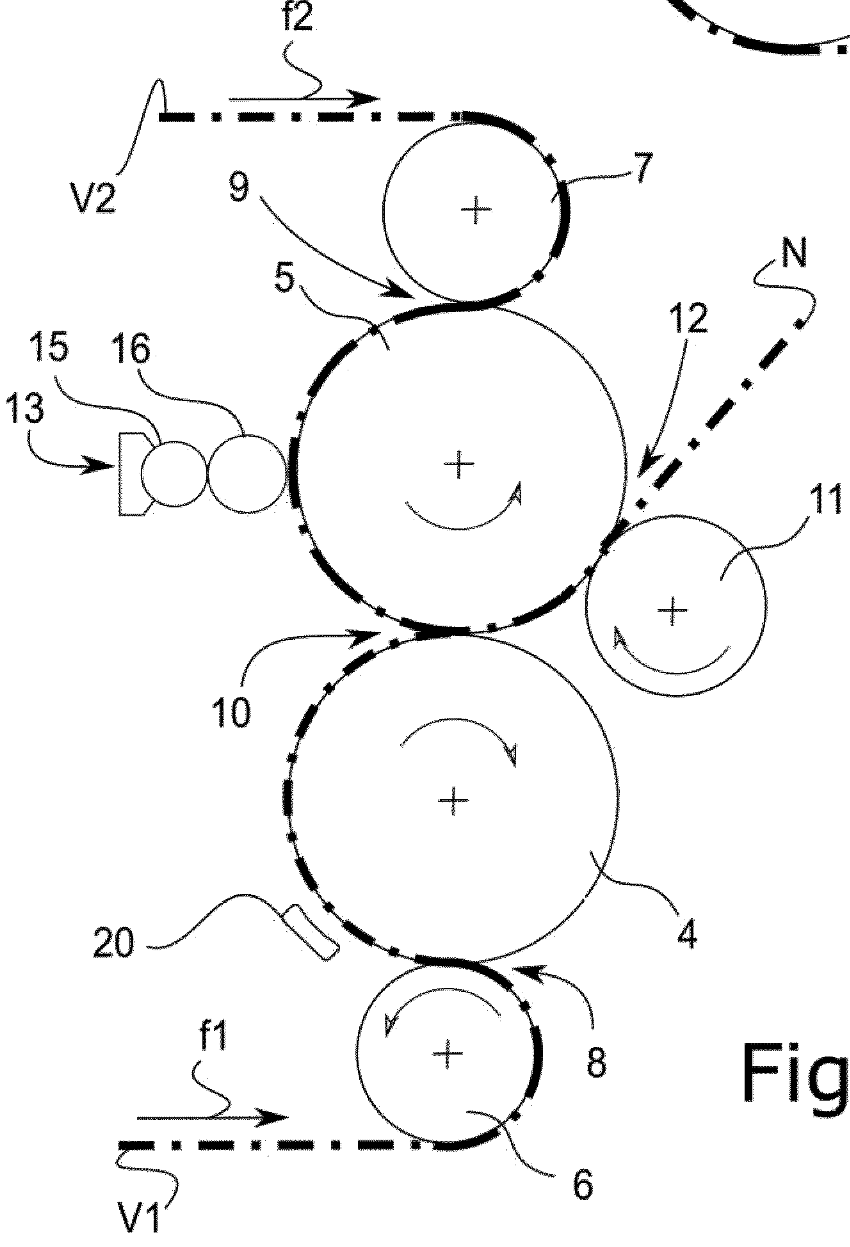
Fig. 6

EMBOSSING DEVICE WITH AT LEAST ONE HEATED EMBOSSING ROLLER, AND METHOD

TECHNICAL FIELD

The present invention relates to improvements to the methods and devices for embossing multi-ply cellulose web materials.

BACKGROUND ART

In the field of manufacturing and converting of tissue paper, to obtain products such as rolls of toilet tissue, kitchen towels, paper napkins and handkerchief or the like, there is known to unwind a plurality of plies of web material, typically made of cellulose fibers, from one or more parent reels and convert the plies into a semi-finished product or into a finished product, which comprises two or more plies bonded to one another.

The bonding of plies of cellulose fibers for the production of a multi-ply web material frequently takes place through the use of a glue or through mechanical ply bonding, i.e., obtained by pressing one ply against the other at high pressure.

For this purpose, at least one of the plies of cellulose fibers is embossed by means of an embossing roller and a pressure roller, typically coated in elastically yielding material. Through embossing, the ply of cellulose fibers is permanently deformed, forming embossed protrusions. While the ply of cellulose fibers is still adhering to the embossing roller, a glue is applied to the embossing protrusions. Subsequently, a second ply is superimposed on the embossed ply of cellulose fibers and the two plies are pressed against each other in the areas that received the glue, to cause their mutual adhesion. Further plies can be added to the aforesaid two plies, for example interposed therebetween or superimposed on them.

Besides allowing application of a glue in limited areas to obtain mutual adhesion of the plies of cellulose material, embossing also has the aim of improving the quality of the multi-ply paper product. For example, it is possible to increase the thickness of each single ply so as to obtain an increase in the volume or in the diameter of the finished product, in the case in which the web material formed by the cellulose plies is wound in rolls. In other cases, it is possible to increase the mechanical strength of the plies, i.e., the ultimate tensile strength, or increase their absorption or softness.

For these reasons methods and machines for embossing plies cellulose material as disclosed in EP1075387, EP1855876, U.S. Pat. No. 3,556,907, EP1239079, EP1319748, U.S. Pat. No. 6,746,558 have been developed. In general, machines of this type are named embossing units or devices, or more correctly embossing-laminating devices, as they carry out embossing operations of at least one ply and lamination of two or more plies.

To further improve the features of the plies of cellulose material, an improved embossing technique using hot embossing rollers has been developed. This technique is described in the Italian patent application MI1995A001197, in which a ply of cellulose material is moistened and fed through a nip formed by a pair of steel embossing rollers provided on the surface with embossing protrusions, in which the protrusions of the two rollers are arranged in contact, under pressure, according to a "tip-to-tip" configuration, and in which the two steel rollers are heated to dry the ply during embossing.

Hot embossing technology is in actual fact very old. A heated embossing roller, configured in particular for use in units for embossing low grammage cellulose plies, such as tissue paper plies, was disclosed already in U.S. Pat. No. 4,252,184. Further embossing devices and embossing-laminating devices that use heated embossing rollers are disclosed in JP6333536, WO2018/229676, JP2007136861, U.S. Pat. No. 5,294,475, US2013/0220151, EP 3747644.

Regardless of the fact that hot embossing technology is already a mature technology, the embossing-laminating devices of the state of the art and the related methods still have some drawbacks, in particular linked to the transitory steps, typically to the initial heating step of the device, and to the temporary stoppages of the embossing device. Stoppages can occur for various reasons, for example due to accidental breakage of a cellulose fiber ply, or in the case of replacement of one or more exhausted parent reels, or also in the case in which one or more parent reels require to be replaced to switch from one production batch to another, or in the case of a halt in the line caused by the stoppage of devices downstream of the embossing-laminating device along the production line.

In these temporary steps, if an embossing roller is heated, one or more rollers adjacent to the heated roller can be subject to indirect heating, as a result of heat exchange with the heated embossing roller. Indirect heating is not controlled and can lead to operation problems in the subsequent production step. In particular, is has been found that indirect heating can lead to a non homogeneous expansion of the rollers, and temporary (and at times even permanent) alterations of the mechanical and structural properties of the rollers. These phenomena lead to operational defects of the embossing-laminating unit, can cause noise and vibrations, and can give rise to the production of defective web material that must be discarded. Indirect heating of a metal roller, for example a glue applicator roller or an embossing roller, can in particular lead to non homogeneous expansion of the roller with consequent vibrations and defects in the finished product during the subsequent start-up step following a temporary stoppage of the embossing-laminating assembly. The greater the production speed, degree of heating and complexity of the embossing patterns, the greater the amount of defective web material. Similar phenomena occur in the case of rubber coated rollers, such as pressure rollers. In this case, in addition to the non-symmetrical expansion around the axis, there are also changes in the properties of the elastomeric material that coats the roller, which softens with the temperature and this phenomenon causes changes in embossing.

Notwithstanding the many developments in hot embossing technology starting from the last two decades of the last century, these drawbacks have not been recognized and hence have not been dealt with.

Therefore, there is a need to provide embossing devices, and in particular embossing-laminating devices that entirely or in part overcome some limitations that affect prior art systems.

The object of embodiments disclosed herein is to provide an embossing device or an embossing-laminating device with at least one heated embossing roller, which solves or reduces at least one of the problems of the embossing devices or embossing-laminating devices of the state of the art.

SUMMARY

Before illustrating the features of the various embodiments of the method, of the device and of the product obtained therewith, some definitions shall be provided.

In the present context, "ply", or "ply of web material" indicates a semi-finished article in the form of continuous web material, typically composed of a cellulose fiber base, for example a ply of tissue paper. The ply can be single or multi-layer.

In the present context, the term "embossing" refers to a process of permanent deformation of a portion of a cellulose structure, such as a ply of web material, typically made of cellulose fibers, orthogonally to the plane on which it lies, through which the cellulose structure is permanently deformed with the formation of protrusions or protuberances that project from the normal plane of the cellulose structure, for example the plane on which the ply lies.

The ply of web material, for example made of cellulose fibers, can be a single ply, or a multi-ply, i.e., formed by several layers or sheets of materials composed of cellulose fibers. The ply formed by several layers can be obtained by superimposing one or more layers of cellulose fibers produced separately and superimposed, or can be obtained through superimposing several layers of slurries of cellulose fibers during production of the ply of cellulose fibers.

"Embossing device" is defined in general as a device that performs an embossing operation on at least one ply of web material, made of cellulose fibers, and optional bonding by laminating two or more plies together, for example using a glue applied to at least one of these plies, preferably to the top surface of at least some of the embossing protrusions formed on one or more plies. When the device is configured to bond two or more plies together it is also referred to as "embossing-laminating device".

"Outer surface" of the embossing roller is meant as the whole of the area that comprises the front surfaces of the embossing protrusions, the sides of the embossing protrusions and the lateral surfaces of the embossing roller, from which the embossing protrusions protrude outward.

"Operating speed" is meant as a (peripheral or angular) speed of a mechanical member of the embossing device or embossing-laminating device during the normal production step, i.e., a production speed.

"Operating temperature" is meant as a temperature of a mechanical member of the embossing device or embossing-laminating device during the normal production step, i.e., a standard operating temperature.

Unless otherwise specified, "heating of an embossing roller" is meant as an action of direct or indirect supply of further heat with respect to the heat generated by the normal operating conditions of the embossing roller, in order to increase the temperature thereof with respect to the temperature that the embossing roller would reach only through phenomena of energy dissipation during normal operation. In fact, it is known that due to the pressures transferred between mechanical members (for example between an embossing roller and a pressure roller) and to their relative movement, a part of the mechanical power supplied to the embossing device is transformed into heat, which causes heating of the embossing rollers.

The supply of heat for heating of the embossing roller can be direct or indirect, in the sense that heat can be transferred as such to the embossing roller, for example through a heat transfer fluid, or can be generated in the embossing roller through the conversion of another form of energy, for example through the Joule effect due to the circulation of eddy current generated by electromagnetic induction.

"Functional roller" is meant, in the present context, as a roller that: (a) rotates when the embossing device, or the embossing-laminating device is operating, (b) carries out an action on a ply of cellulose material, and (c) is not directly heated by an own heating device.

As will be clear from the description below, functional rollers are pressure rollers, marrying rollers, cliché rollers or other rollers that apply a product to the ply of web material, i.e., to the ply of cellulose fibers, driven around a heated embossing roller. An unheated embossing roller that coacts with a heated embossing roller can also be a functional roller.

A functional roller that coacts with an embossing roller can be in direct or indirect contact with the embossing roller, and hence transfer thereto a mechanical action. For example, the pressure roller coacts with the embossing roller by pressing against it, with the interposition of the ply of cellulose material to be embossed. In this case, the action carried out by the functional roller in combination with the embossing roller consists in embossing the ply of cellulose fibers. A cliché roller of a glue dispensing assembly is a functional roller the action of which on the ply of cellulose fibers consists in the distribution of a glue. A further functional roller is the marrying roller, the action of which on the ply of cellulose fibers consists in pressing the ply of cellulose fibers on another ply of cellulose fibers to cause mutual adhesion of the plies of cellulose fibers. An embossing roller not associated with an own heating device is a functional roller the action of which, among others, is to emboss the ply of cellulose fibers.

The position of the functional roller is defined "adjacent" or "close to" with respect to a heated embossing roller, when the functional roller receives heat directly or indirectly from the heated embossing roller, in particular, for example, also when the functional roller and the heated embossing roller are in non-operating position, i.e., when the embossing device, or embossing-laminating device, is, e.g., in conditions of temporary stoppage, or in a transitory step, for example a starting, stoppage, heating or cooling step.

The functional roller can receive heat from the heated embossing roller also indirectly, in the sense that the heated embossing roller can transfers heat to a first functional roller directly facing the heated embossing roller, and the first functional roller in turn transfers heat to a second functional roller facing the first functional roller. In this case, the second functional roller is heated indirectly by the embossing roller, through the first functional roller. Examples described below will better clarify this concept.

During normal operation of the embossing device, or embossing-laminating device, i.e., when it is producing continuous embossed web material, a functional roller can be in contact or not in contact with a respective heated embossing roller. In fact, the functional roller can coact with the embossing roller both by transferring a mechanical action thereto, which involves mutual contact (optionally with the interposition of one or more cellulose plies between them), and without transferring a mechanical action thereto. The latter case occurs, for example, when the functional roller is an unheated embossing roller, arranged with respect to the heated embossing roller so that there is no mutual transfer of forces between the surfaces of the embossing rollers, for example when these are two embossing rollers of an embossing-laminating device of nested or DESL type. The acronym DESL stands for Double Embossing Single Lamination and indicates an embossing technique in which two plies are embossed separately (with two identical or different embossing patterns) and are then bonded to each other with the embossing patterns in phase, so that the protrusions of one ply fall into the areas between adjacent protrusions of the other ply. Other examples of embossing devices in which the functional roller does not transfer a mechanical action to the heated roller, i.e., in which there is no mutual contact, are disclosed in EP1187716, EP1075387, EP1855876.

"Rotation of a functional roller", in the transitory, i.e., non-operating, step of the embossing device, is meant as a rotating movement of the functional roller around the axis thereof that can be counter-clockwise or clockwise, continuous or intermittent, i.e., consisting of a period of rotation alternated with a period in which the functional roller is stopped, at constant or variable speed. Typically, but not necessarily, the rotation speed of the functional roller in a transitory step is lower than the operating speed.

According to one aspect, an embossing device is disclosed herein comprising a first path for a first ply of web material and, along the first path, a first embossing roller provided with embossing protrusions. The embossing device further comprises a first heating device associated with the first embossing roller to heat the surface of the first embossing roller. At least a first functional roller of the embossing device is adapted to perform an action on a ply of web material. The first functional roller is provided with a rotation arrangement, adapted to keep the first functional roller in rotation during a temporary stoppage of the embossing device, with said first functional roller spaced from the first embossing roller and with the first ply of web material stationary in the first path. The rotation arrangement is controlled so as to rotate the first functional roller during the temporary stoppage of the embossing device. In this way, the indirect heating of the functional roller, due to the heat radiated by the embossing roller, with which the functional roller is associated, is made uniform by the rotation imparted to the functional roller by the rotation arrangement.

According to a further aspect, disclosed herein is a method for managing a temporary stoppage of an embossing device comprising: a first path for a first ply of web material; along the first path, a first embossing roller provided with embossing protrusions; a first pressure roller defining with the first embossing roller a first embossing nip, through which the first ply of web material passes; a second path for a second ply of web material; along the second path, a second embossing roller, provided with embossing protrusions; a second pressure roller defining with the second embossing roller a second embossing nip, through which the second ply of web material passes; a first heating device configured to heat the surface of the first embossing roller. The method comprises the following steps:

- maintaining the first ply of web material substantially stationary along the first path and the second ply of web material substantially stationary along the second path;
- moving the second pressure roller away from the second embossing roller;
- rotating the second embossing roller to maintain an approximately uniform surface temperature of said second embossing roller, while the temperature of the first embossing roller is higher than the temperature of the second embossing roller, the second embossing roller sliding on the second ply of web material.

According to yet another aspect, there is described an embossing device comprising a first path for a first ply of web material and, along the first path, a first embossing roller provided with embossing protrusions. The embossing device further comprises a first pressure roller defining with the first embossing roller a first embossing nip, through which the first ply of web material passes. The embossing device further comprises a second path for a second ply of web material and, along the second path, a second embossing roller, provided with embossing protrusions. The embossing device further comprises a second pressure roller defining with the second embossing roller a second embossing nip, through which the second ply of web material passes. A first heating device is placed to heat the surface of the first embossing roller. The second embossing roller is adapted to be maintained in rotation during a step of temporary stoppage of the embossing device, with the first ply of web material and the second ply of web material stationary in the respective first path and second path, the second pressure roller spaced from the second embossing roller and the first embossing roller at a temperature higher than the room temperature.

Further advantageous features and embodiments of the method and of the embossing device are described below with reference to examples of embodiment and are defined in the appended claims, which form an integral part of the present description.

BRIEF DESCRIPTION OF THE DRAWINGS

The invention will be better understood by following the description and the accompanying drawings, which illustrate a non-limiting example of embodiment of the invention. More in particular, in the drawing:

FIGS. 5, 6 and 7 illustrate examples of schematics of further embodiments.

DETAILED DESCRIPTION

In the description below specific reference will be made to an embossing-laminating device, i.e., (as mentioned above) to a device adapted to emboss at least one first ply of web material, typically a ply of cellulose fibers, and to bond said first ply, after it has been embossed, to a second ply of web material, typically a ply of cellulose fibers, optionally also embossed, by the same embossing device, or by another embossing device upstream. Typically, exemplary embodiments disclosed herein relate to embossing-laminating devices with two embossing assemblies, i.e., with two pairs each formed by an embossing roller, provided with embossing protrusions, coacting with a pressure roller, for example typically coated with a yielding material.

However, the teachings contained herein can also be used in a simple embossing device, i.e., in a device adapted to emboss a single ply of web material (formed by a single layer or by several layers superimposed on one another), and without bonding devices to a second or further ply of web material after embossing.

Moreover, hereunder specific reference will be made to an induction heating system applied to two embossing rollers of an embossing-laminating device. However, it must be understood that novel features of the devices and of the methods disclosed herein can be advantageously applied also when heating is limited to a single embossing roller and/or when the embossing roller or rollers is/are heated with different systems, rather than by induction, for example by means of a heat transfer fluid, which circulates in the embossing roller, or with radiant heating systems, for instance.

The embodiments with only one heated embossing roller are particularly useful and advantageous, and exemplary embodiment of this type will be described below.

Moreover, while in the exemplary embodiments described in detail the induction heating members are external to the embossing rollers, in other currently less preferred embodiments the induction heating devices can be located inside the embossing rollers.

Figure 1:
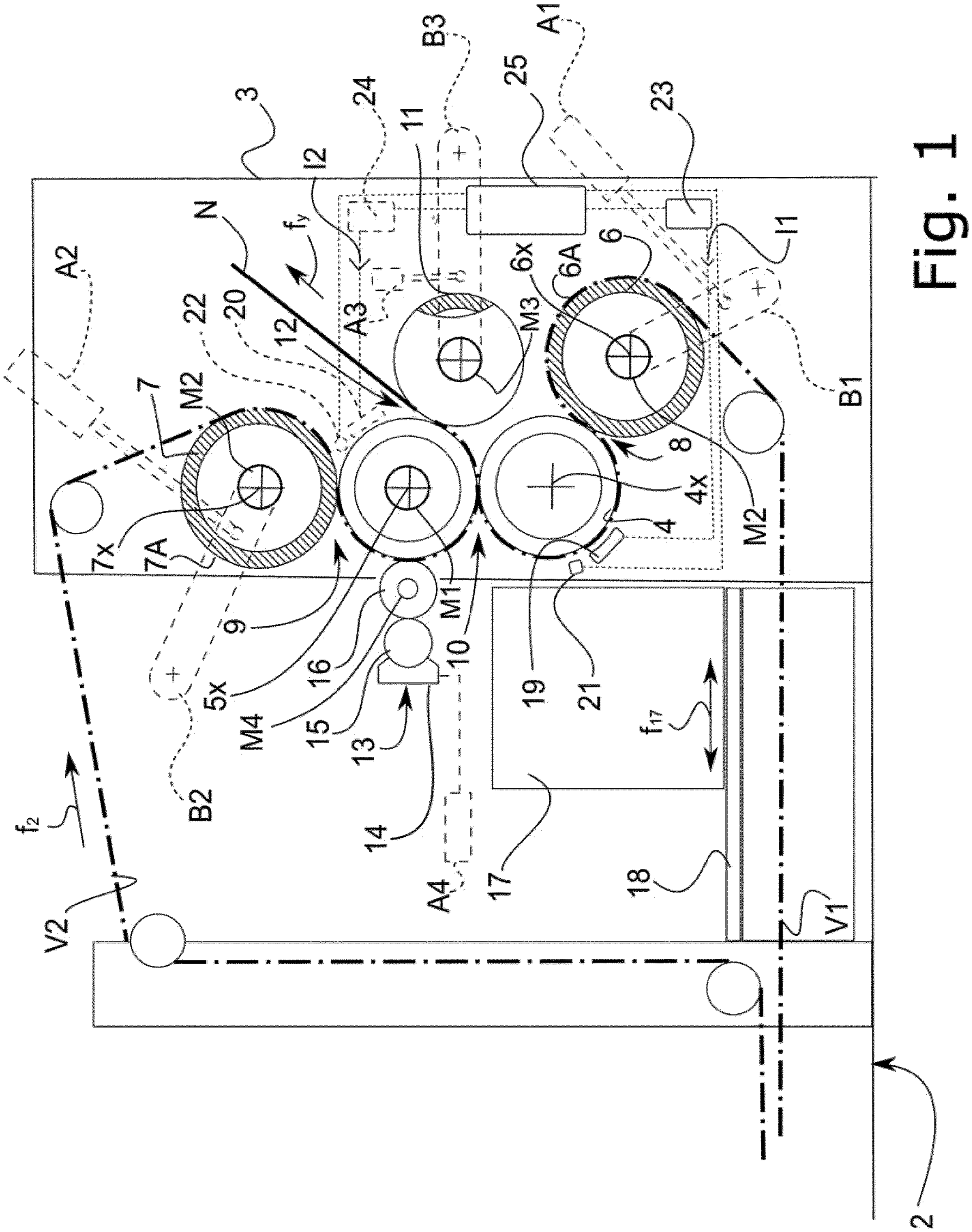
FIG. 1 shows a side view of an embossing-laminating device comprising an electromagnetic induction device.

With initial reference to FIG. 1, the illustrated embodiment is provided with an embossing-laminating device 1 having a load bearing structure indicated as a whole with 2. The load bearing structure can comprise two side walls 3.

Figure 1B:
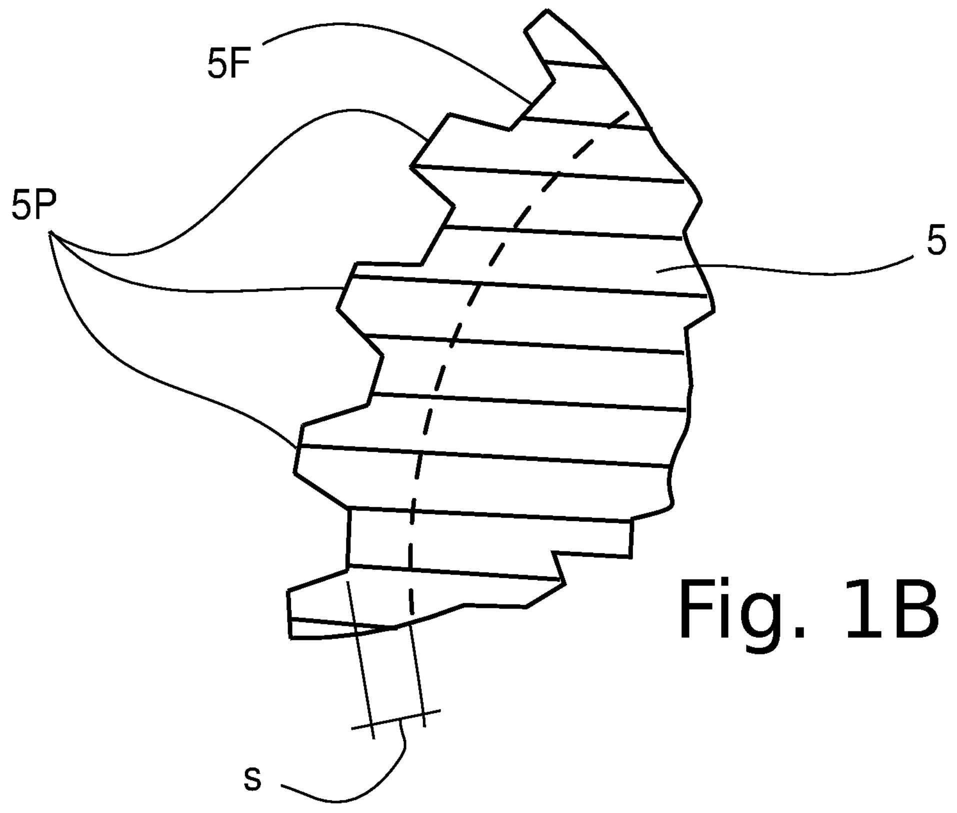
FIGS. 1A and 1B illustrate an enlargement of a detail of FIG. 1.
Figure 1A:
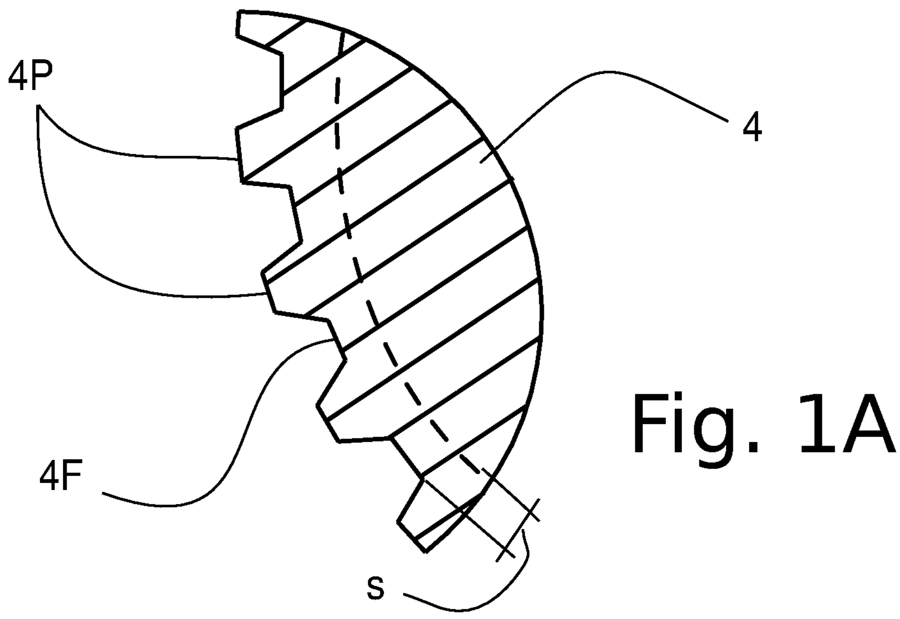

In some embodiments, an embossing roller 4 and a further embossing roller 5 can be arranged between the two side walls 3 of the load bearing structure 2. The embossing roller 4 can be provided with embossing protrusions 4P, as shown in the enlarged detail of FIG. 1A, while the further embossing roller 5 can be provided with embossing protrusions 5P, as shown in the enlargement of FIG. 1B. It is possible to define as base surface of the embossing roller 4, 5 that surface of the roller that separates the bases of the embossing protrusions 4P, 5P, and is indicated with 4F and 5F. Generally, the base surface 4F, 5F is smooth. In the case of double height embossing protrusions, the base surface of the embossing roller is considered the surface that separates the bases of the protrusions of lower height.

The embossing roller 4 can coact with a first pressure roller 6. In some embodiments, the pressure roller 6 can be coated with an outer layer 6A made of yielding, preferably elastically yielding, material, for example rubber. The further embossing roller 5 can coact with a second pressure roller 7. In some embodiments, the pressure roller 7 can also be coated with an outer layer 7A of yielding, preferably elastically yielding, material.

The axes of rotation of the two embossing rollers 4, 5 and of the two pressure rollers 6, 7, respectively, are indicated with 4X, 5X, 6X and 7X. These axes are substantially parallel to one another.

In some embodiments, the two embossing rollers 4 and 5 are rotated by a pair of motors, for example electric motors. In other embodiments, a single motor can be provided, which operates both embossing rollers 4, 5 through a gear drive. In FIG. 1, M1 schematically indicates a motor, typically an electric motor, which rotates the embossing roller 5, while the embossing roller 4 can be rotated by an autonomous motor, not shown, or through a gear drive, comprising two gears of equal diameter coaxial to the two rollers 4, 5.

The embossing roller 4 and the first pressure roller 6 form a first embossing nip 8 therebetween, through which a first ply V1 passes to be embossed by the protrusions 4P of the embossing roller 4. When the pressure roller 6 is provided with a yielding outer coating 6A, the protrusions 4P are pressed against the first pressure roller 6 and penetrate the yielding coating 6A, permanently deforming the ply V1.

The further embossing roller 5 and the second pressure roller 7 form a second embossing nip 9, through which a second ply V2 passes. The second ply V2 is embossed in the same way as the first ply V1, as a result of the protrusions 5P of the further embossing roller 5, which are pressed against the second pressure roller 7. If this is provided with an elastically yielding coating 7A, the embossing protrusions 5P penetrate the yielding coating and cause permanent deformation of the ply V2.

Each ply V1, V2 can, in turn, be formed of two layers or plies.

The two pressure rollers 6, 7 can be supported by arms or other members that allow them to move toward or away from the respective embossing rollers 4, 5 for the purposes that will be explained below. Actuators indicated schematically with A1, A2, for example piston-cylinder actuators, can be used respectively to press the pressure roller 6 against the embossing roller 4 and the second pressure roller 7 against the further embossing roller 5. Schematically, B1 indicates a pair of pivoting arms that support the pressure roller 6 and B2 indicates a pair of pivoting arms that support the pressure roller 7.

In some embodiments, the two embossing rollers 5, 6 can be configured to operate in a tip-to-tip mode, i.e., with their protrusions 4P, 5P pressed against one another in a nip 10 formed between the two embossing rollers 4, 5.

In other embodiments, the embossing-laminating device 1 can be configured so that there is no mutual contact between the embossing rollers 4, 5 in the nip 10. In this case, the embossing-laminating device 1 can comprise a marrying roller 11 pressed against the embossing roller 5 and forming therewith a marrying nip 12. In this way, the two plies V1 and V2 can be laminated between the further embossing roller 5 and the marrying roller 11. In the nip 10 the embossing rollers 4, 5 are slightly spaced from each other, so that the two plies V1, V2 are not in contact. In this case, the embossing device can produce an embossed material according to the nested technique, with embossing protrusions of the ply V2 nested between embossing protrusions of the ply V1 and vice versa.

Similarly to the pressure rollers 6, 7, the marrying roller 11 can be supported by a pair of pivoting arms B3 and pressed against the embossing roller 5 by means of an actuator A3, for example a piston-cylinder actuator.

In some embodiments, the embossing-laminating device 1 can be configured to operate alternatively according to the tip-to-tip technique or according to the nested technique. To this end, the embossing rollers 4, 5 can, for example, be movable parallel or orthogonally to their axis and the marrying roller can be movable alternatively to an active position and to an idle position.

The embossing-laminating device 1 can comprise a functional fluid dispenser 13. The functional fluid dispenser 13 is a device adapted to dispense a liquid or gaseous fluid, on the ply V2. For example, the functional fluid dispenser 13 can dispense saturated or unsaturated steam, to facilitate the adhesion, obtained through pressure, of the plies V1 and V2. In preferred embodiments, as shown in FIG. 1, the functional fluid dispenser 13 can comprise a liquid source 14, a first anilox roller 15, which picks up a liquid from the liquid source 14, and a second cliché roller or applicator roller 16, which receives the liquid from the anilox roller 15 and distributes it on portions of the embossed ply V2 adhering to the further embossing roller 5. In general, the liquid is applied to at least some of the tips of the embossing protrusions 5P with which the embossing roller 5 is provided, on the portions of ply embossed by the embossing protrusions 5P. The liquid can be water or glue. When the liquid is water, adhesion of the plies takes place prevalently through mechanical pressure. The water facilitates the formation of hydrogen bonds between the fibers of the plies, so as to obtain a better mutual adhesion. Adhesion without the use of glues is in some cases called autogenous bonding. In this case, it is possible to replace the marrying roller 11 with an assembly for the mechanical ply-bonding of paper as disclosed in WO2021058687.

In advantageous embodiments, the embossing roller 4 and the further embossing roller 5 can be made of metal material, for example steel. In some embodiments, the embossing rollers 4, 5 can be made of ferromagnetic material. The surface of the embossing rollers can be treated with a surface hardening treatment. The embossing protrusions 4P and 5P of the embossing rollers 4 and 5 can be generated in any suitable way, for example by chemical etching, by laser etching, by chip removal by means of a tool, or in another suitable way. In some embodiments, the hardening treatment can be carried out on the embossing protrusions 4P and 5P only.

When the embossing-laminating device 1 is in operating conditions, the first ply V1 and the second ply V2 advance according to arrows f1 and f2 toward the embossing rollers 4, 5 to be embossed separately between the pairs of rollers 4, 6 and 5, 7. The embossed plies V1, V2 are glued and laminated between the embossing roller 5 and the marrying roller 11 and consequently form a multiple ply web material N that advances according to the double arrow fN toward a station downstream, for example a rewinder, not shown. The pressure roller 7 is pressed against the embossing roller 5, while the pressure roller 6 is pressed against the embossing roller 4 and the marrying roller 11 is pressed against the embossing roller 5 to obtain bonding of the plies V1, V2.

In some embodiments, the functional fluid dispenser assembly 13 is mounted on a slide or carriage 17 which can move according to the double arrow f17, for example along guides 18 carried by an element of the fixed structure 2. The movement according to the double arrow f17 can be controlled by a suitable actuator, for example a piston cylinder actuator, an electric motor, or any other suitable actuator, indicated generically with A4.

In advantageous embodiments, a heating device is associated with at least one embossing roller 4, 5. In the embodiment illustrated in FIG. 1, each embossing roller 4, 5 is associated with a respective heating device 19, 20.

In the embodiment illustrated, the heating devices 19, 20 are each placed externally to the respective roller.

In the particularly advantageous embodiment of FIG. 1, each heating device 19, 20 is an electromagnetic induction heating device, and is indicated hereinafter briefly as electromagnetic induction device, or simply induction device 19, 20. These induction devices are configured to induce eddy currents in the material of the respective embossing roller 4, 5.

More in particular, induction heating by means of eddy currents is concentrated in particular in the material of the embossing rollers 4, 5 adjacent to the outer surface of the respective embossing roller 4, 5. This can be obtained advantageously by placing the heating devices 19 and 20 outside the embossing rollers 4, 5. The heating is obtained by Joule effect due to the circulation of eddy currents induced in the metal material of the embossing rollers 4, 5 by the variable magnetic field generated by the respective induction device 19, 20.

In practice, the induced eddy currents circulate locally on the surface of the embossing roller 4, 5 and produce a heating proportional to the electrical resistance of said embossing roller and to the square of the induced eddy current.

As shown in FIG. 1, preferably the electromagnetic induction device 19 associated with the embossing roller 4 is positioned in an area comprised between the point of contact with the pressure roller 6 and the nip 10 for space reasons. In other embossing-laminating devices with different configurations, it is possible to position the electromagnetic induction device differently, for example between the point of contact with the pressure roller 6 and the nip 10.

Similarly, the electromagnetic induction device 20 (indicated with a dashed line in FIG. 1) associated with the embossing roller 5 can be positioned alternatively between the point of contact with the pressure roller 7 and the cliché roller 16, between the point of contact with the pressure roller 7 and the marrying nip 12 or between the cliché roller 16 and the nip 10. The choice of one or more of these positions depends on the architecture of the specific embossing-laminating device.

Each electromagnetic induction device 19, 20 is associated with a respective generator, for example an inverter 23, 24, adapted to drive the appropriate currents that circulate in the induction device 19, 20 so as to obtain the desired heating. In a currently preferred configuration, to adjust the desired temperature, i.e., the operating temperature, on the surface of the embossing rollers 4, 5 a closed loop control system is provided, comprising at least one temperature sensor 21, 22 of any type, such as thermocouples, pyrometers, thermal cameras or another suitable device, associated with the respective embossing roller 4, 5 and connected to a control unit 25 that, suitably programmed and through a suitable control algorithm, controls the inverter 23, 24 so as to stabilize the desired temperature on the outer surface of the embossing rollers 4, 5, as will be explained in greater detail below. The control unit can be a PLC, an industrial computer, a microprocessor, a network of computers or any other similar known device.

The generators 23, 24 can be inverters that operate at a specific operating frequency approximately the same as the resonant frequency of the electric circuit formed by the electromagnetic induction device 19, 20 with the output of said inverter.

Regulation of the operating temperature of the embossing roller 4, 5, with which the induction device 19, 20 is associated, can take place as follows. The induction device 19, 20 is adjusted to dispense the maximum power. This power is maintained until reaching the desired operating temperature (or just under this temperature, for example at least ¾ of this temperature). A controller is then activated, for example a PID (proportional-integral-derivative) controller, which is associated with the induction device and with the unit 25, and which has the aim of maintaining the temperature constant. The controller regulates the heat generated by induction in order to compensate the heat removed as a result of heating of the ply V1 or V2 and the heat lost through forced convection, caused by the rotation of the embossing roller 4, 5 into the ambient air. Activation of the PID controller after reaching the desired target temperature makes it possible to obtain shorter heating time, with respect to the case of application of a PID controller from the start of heating. In practice, the PID controller regulates the power of the induction device so that the temperature detected by the sensor minus the "target" temperature (operating temperature) is equal or close to zero. It is understood that other types of temperature regulation differing from the aforesaid regulation mode are possible.

In preferred embodiments, during the heating step, i.e., to take the embossing roller 4, 5 from the room temperature to the operating temperature, the embossing roller is maintained in rotation at low speed. In this step, the embossing roller can be heated both if the cellulose ply V1, V2 is wrapped around it and if it is completely free of the ply. In the first case, the pressure roller is preferably open, i.e., not in contact with the embossing roller, allowing the latter to rotate sliding on the paper in contact with the roller. In this case, the paper is not fed toward the stations downstream, avoiding discarding a large amount of paper.

Figure 2:
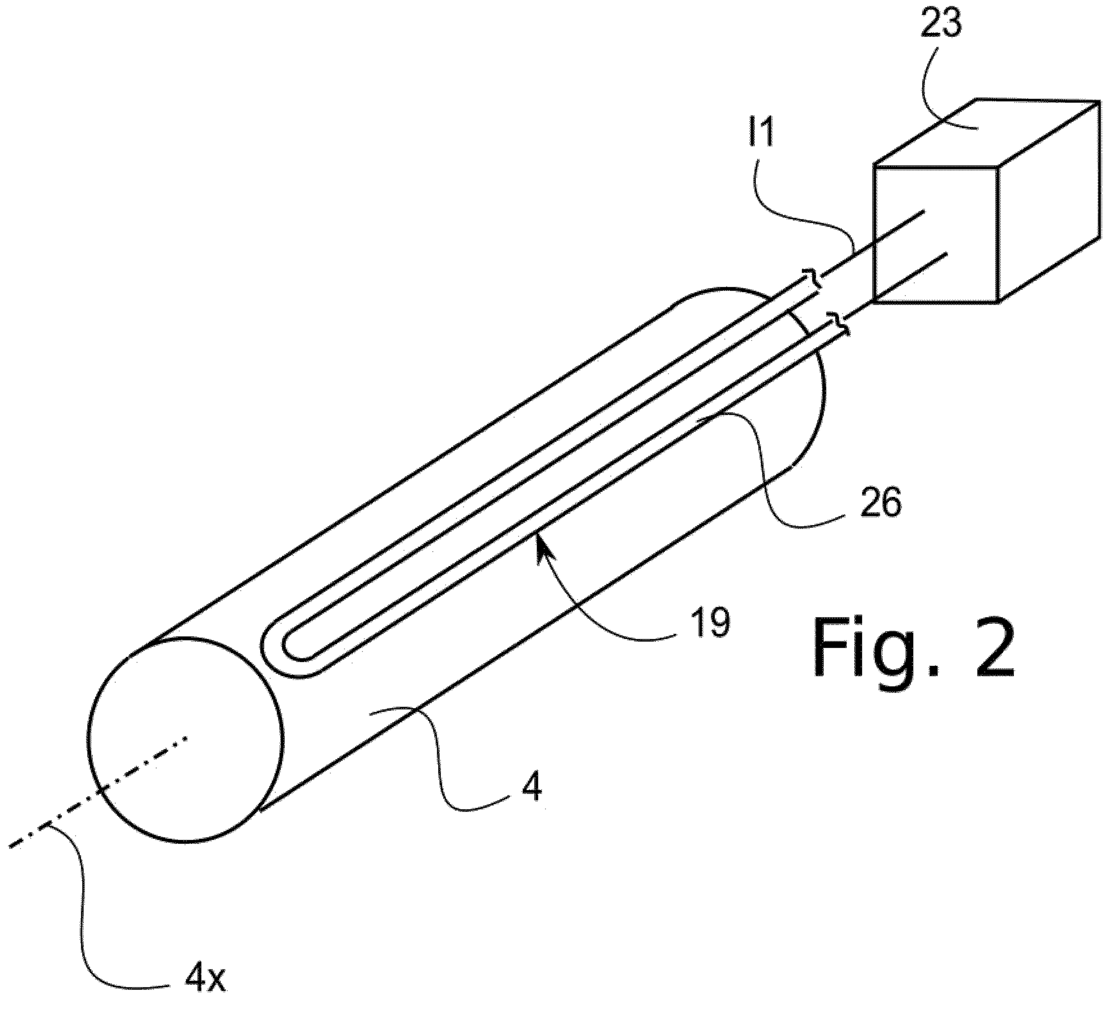
FIG. 2 illustrates an axonometric view of an embossing roller associated with an electromagnetic induction device.
Figure 3:
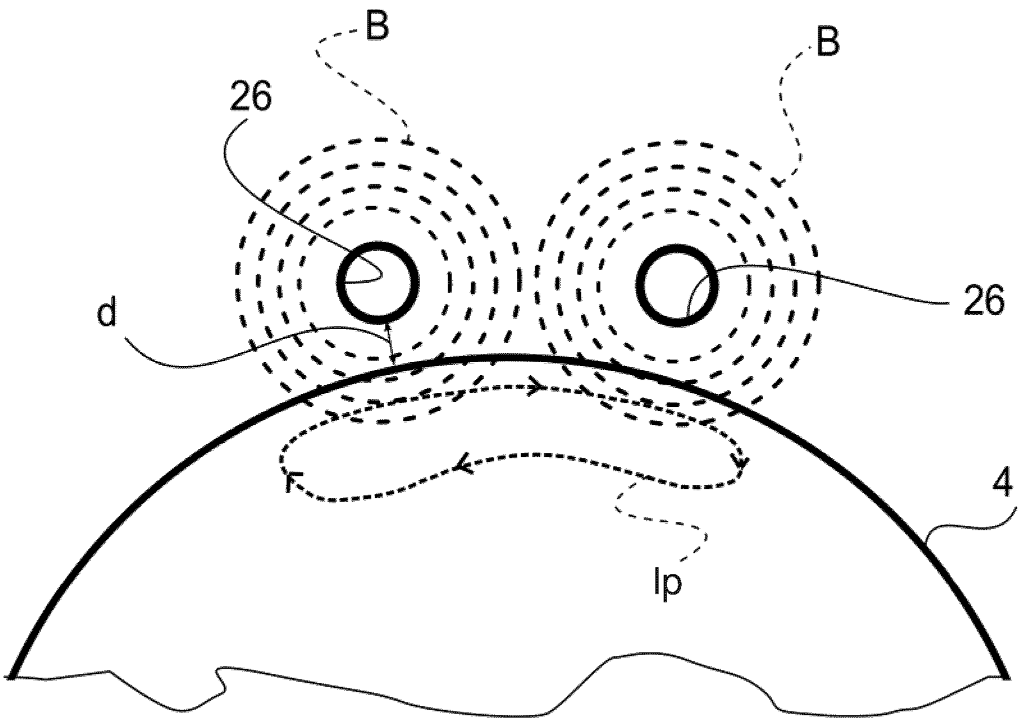
FIG. 3 illustrates a section view of FIG. 2 according to a plane orthogonal to the axis of the roller.

As shown schematically in FIG. 2 and FIG. 3, the electromagnetic induction device 19, 20 can comprise a single coil 26 of conductive material, such as copper or another suitable material, of elongated shape and placed approximately parallel to the axis 4X, 5X of the embossing roller 4, 5. In other configurations, the electromagnetic induction heating device 19, 20 can comprise more than one coil.

In an embodiment, the coil 26 of conductive material can be supported by a movable frame 27 to be able to move the coil 26 toward or away from the outer surface of the embossing roller 4, 5. In some embodiments, the frame 27 pivots according to the arrow f29 around a pivot 29. The pivoting movement of the frame 27 toward and away from the embossing roller 4, 5 can be obtained through an actuator 28 connected to the end 27A of the frame 27. The actuator 28 can be a pneumatic piston controlled by a solenoid valve, not shown, connected to the control unit 25. In this case, by extending or retracting the rod of the piston, it is possible to move the electromagnetic induction device 19, 20 respectively away from and toward the outer surface of the embossing roller 4, 5. In other embodiments, the actuator 28 can be an electric motor.

Other alternative movement mechanisms of the frame 27 can be provided for the same purposes. For example, it is possible to mount the frame 27 on a slide sliding along a guide to move the frame 27 toward and away from the embossing roller 4, 5 through an actuator such as a pneumatic piston or an electric motor.

The position of the coil 26 with respect to the embossing roller 4, 5 is preferably such that the two conductor sections that form the coil 26 are equidistant with respect to the outer surface of the respective embossing roller 4, 5, at least when the coil 26 is in the operating position.

Figure 4:
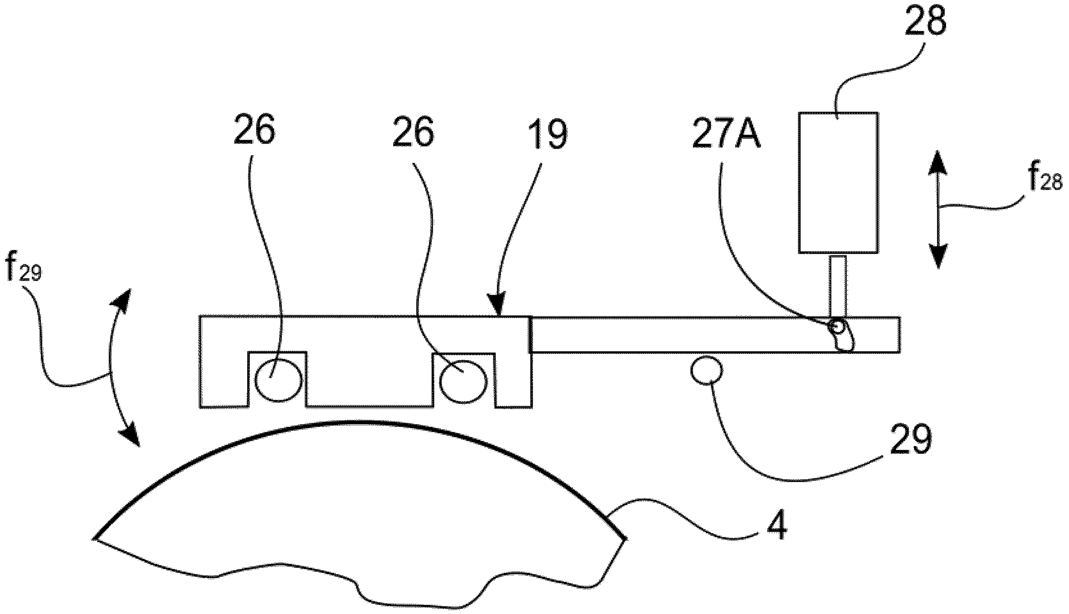
FIG. 4 illustrates a detail of embodiment.

In a particularly advantageous embodiment, as shown in FIG. 4, the frame 27, in the part that supports the coil 26, can be formed by an electromagnetic flux concentrator element 27A adapted to direct the electromagnetic flux more efficiently toward the outer surface of the roller.

Preferably, the electromagnetic flux concentrator 27A is "E" shaped and surrounds the coil 26 almost completely, but leaves the side facing the embossing roller 4, 5 free. In this way, the electromagnetic flux leakage is reduced and is concentrated toward the outer surface of the embossing roller 4, 5 obtaining, heating being equal, smaller supply currents of the electromagnetic induction device 19, 20. The electromagnetic flux concentrator 27A can be made of ferrite or formed by a pack of non-conductive ferromagnetic laminations, and due to its high magnetic permeability, directs the electromagnetic field lines toward the free side of the coil facing the embossing roller 4, 5. The electromagnetic flux concentrator 27A can also have other shapes, for example a rectangular or "C" shape, or others. FIG. 4 shows only a section of the coil 26 and of the electromagnetic flux concentrator 27A which in the preferred embodiment surrounds the coil for the whole of the length of the electromagnetic induction device.

In a currently preferred modified embodiment, the embossing-laminating device 1 can be provided with one or more sensors, not shown in the figure, to detect breakage of the cellulose plies and possible accumulation of the plies V1, V2 on the embossing rollers 4, 5. To this end, video cameras, photocells, arrays of photocells, laser sensors or the like can be used.

In the case in which the pressure rollers 6, 7 are moved toward the respective embossing rollers 4, 5 with pneumatic piston-cylinder actuators, it is possible to generate an accumulation signal of the plies V1 or V2 around the embossing rollers detecting a pressure peak on the piston-cylinder actuators. In other words, accumulation of the plies V1 or V2 around the embossing roller 4, 5 increases the pressure exerted by the pressure roller 6, 7 against the embossing rollers 4, 5. When the paper breakage detection sensors generate an accumulation signal transmitted to the control unit 25 to which they are connected, the latter immediately controls the frame 27 to move away from the embossing roller 4, 5, to avoid damage both to the embossing rollers and to the electromagnetic induction device, and puts the machine in emergency mode.

In some embodiments, it is possible to use more than one induction device, or electromagnetic induction device 19, 20 for each embossing roller 4, 5, so as to obtain a surface temperature that is as homogeneous as possible. In this case, the electromagnetic induction devices 19, 20 can be supplied by the same inverter or each by a respective inverter controlled by the central control unit 25 as a function of the temperature of the outer surface of the embossing roller 4, 5 detected by the temperature sensor or sensors.

The electromagnetic induction device 19, 20 can be cooled with suitable cooling devices. For example, it is possible to circulate a coolant inside the coil or around the coil 26 of the electromagnetic induction device 19, 20. For example, the coil 26 of the electromagnetic induction device can be formed by a copper pipe or another electrically and thermally conductive material. The coolant can circulate inside the pipe.

During operation, the coil 26 made of conductive material is supplied with an alternating current I1, I2 and placed in an operating area at a distance d from the outer surface of the respective embossing roller 4, 5. In this way, a time-varying magnetic field B is created, the field lines of which penetrate the outermost part of the embossing roller 4, 5, i.e., the protrusions 4P, 5P and the first non-etched layer of the cylindrical sleeve of the respective embossing roller, 4, 5, for example for a depth S (see FIGS. 1A, 1). The time-varying magnetic field induces eddy currents $I_p$ in the electrically conductive material, of which at least the outermost part of the respective embossing roller 4, 5 is made. The eddy currents heat the embossing roller 4, 5 through the Joule effect.

The distance d can be variable to regulate and optimize the magnetic flux, and can, for example, range from 1 mm to 8 mm. It must be understood that the mentioned numerical values are merely examples and may be preferred, but are not binding.

In some cases, it is possible to use more than one temperature sensor associated with each of the two embossing rollers 4, 5 and, more in general, it is possible to use several temperature sensors of different type for each embossing roller 4, 5, for example, one or more thermocouples, pyrometers and/or thermal cameras. Generally, the sensors are placed externally to the respective embossing roller 4, 5 with which they are associated. In other cases, it is possible to insert these sensors inside the respective embossing roller. For example, it is possible to place several thermocouples inside the respective embossing roller 4, 5 at different depths to monitor the temperature of the roller in the radial direction, i.e. in several points along the thickness of the embossing roller, at radially increasing distances from the axis of the embossing roller, and hence at decreasing distances from the outer surface of the embossing roller.

The use of a thermal camera as a temperature sensor can be preferable with respect to other temperature sensors, as the thermal camera is able to provide a more complete picture of the temperature distribution on the surface of the embossing rollers 4, 5. For example, it is possible for the embossing protrusions 4P, 5P to be at a temperature higher than the base surface 4F, 5F of the embossing rollers 4, 5, or vice versa. In this case, it can be useful to change and in general to suitably control the frequencies or the intensities of the electromagnetic induction currents I1, I2 supplied by the inverters 23, 24 toward the electromagnetic induction devices 19, 20.

In fact, the eddy currents induced on the outer surface of the embossing rollers 4, 5, generated by the time-varying magnetic field, have a penetration depth into the embossing roller which is a function of the magnetization frequency of the electromagnetic induction devices 19, 20.

In some embodiments, it is possible to detect the temperature profile of the outer surface of the embossing roller 4, 5 highlighting any temperature differences between the embossing protrusions 4P, 5P and the base surface 4F, 5F of the respective embossing roller 4, 5, and any temperature anomalies between the outer surface of the embossing roller and the innermost part of the embossing roller 4, 5. In this case, the central control unit 25 can control the inverter 23, 24 to modify the frequency and/or the intensity of the electromagnetic induction currents I1, I2 and obtain an optimal temperature profile, i.e., a temperature profile in which only the outer surface of the embossing roller is at the desired temperature.

In some embodiments, the operating frequency can, for example, range from 50 Hz to 500 kHz and preferably from 1 kHz to 100 kHz, more preferably from 5 kHz to 100 kHz, and even more preferably from 10 kHz to 60 kHz, i.e., between values for which the induced eddy currents $I_s$ are confined to a greater extent on the embossing protrusions 4P, 5P.

In some embodiments, which can also be a function of the embossing pattern, i.e., of the size, shape and distribution of the embossing protrusions 4P, 5P, it is possible to regulate the embossing-laminating device 1 so as to keep the temperature of the embossing protrusions 4P, 5P higher than the temperature of the base surface 4F, 5F. In some embodiments, the control unit 25 controls the inverter 23, 24 to keep only a very small surface thickness S of the cylindrical shell of the respective embossing roller 4, 5 at the desired temperature, so as to decrease the energy required for heating and to obtain rapid cooling of the outer surface of the embossing roller 4, 5 when a reduction in the operating temperature is required.

The embossing-laminating device 1 can comprise a cooling system 30 (for example indicated in FIG. 1) for the embossing roller 4, 5 with which the electromagnetic induction device 19, 20 is associated. The cooling system 30 can be configured to cool the heated embossing roller 4, 5 during machine stoppages, in the case in which the operator is required to work close to the hot embossing roller. Access to the machine is only permitted in safe conditions: the rollers must all be stopped, any brakes activated and the temperature of heated rollers must be below the safety limit value.

The cooling system 30 can comprise a device that emits cooling air toward the embossing roller 4, 5 to be cooled. In some embodiments, the cooling system 30 can comprise one or more nozzles that generate a cooling air knife.

The nozzle can have an elongated slot that emits a flow of air with an elongated, i.e., linear, emission front, preferably at least equal to the axial length of the embossing roller to be cooled. In other embodiments, the cooling device can comprise an emission device of the vortex tube type, also known with the name "Ranque-Hilsch vortex tube".

Conversely, when it is necessary to stop the embossing device 1 for production needs, and hence not due to breakages, malfunctions, maintenance or other events that require the presence of an operator close to the embossing rollers 4, 5, it is necessary to prevent any substantial reduction in the temperature of the heated embossing roller 4, 5 from occurring. By maintaining the temperature of the embossing roller 4, 5 around the operating temperature also during temporary stoppages, rapid restarting of the embossing-laminating device 1 is possible, when the cause of the stoppage has been dealt with. For example, if the stoppage is caused by the need to replace a parent reel in the unwinder that feeds the ply V1 or the ply V2, it is advantageous to resume production again as soon as the parent reel has been replaced and the trailing edge of the exhausted ply has been spliced to the leading edge of the new ply.

To this end, the electromagnetic induction device 19, 20 can be maintained in operation to maintain the temperature of the or each heated embossing roller 4, 5 or alternatively switched off, if the stoppage lasts for a short time.

For brief stoppages, one or both electromagnetic induction devices 19, 20 can be deactivated, since the embossing rollers have a high thermal inertia. Therefore, their temperature decreases only slightly even if the electromagnetic induction devices 19, 20 are switched off temporarily during the transitory steps.

If the electromagnetic induction devices 19, 20 remain active during the temporary stoppages, and if the respective heated embossing rollers 4, 5 were to remain stationary during these temporary stoppages, the latter would heat up unevenly and more in particular only in the portion facing the respective electromagnetic induction device 19, 20. This would cause various drawbacks. Firstly, a part of the embossing roller would rapidly be at a temperature below the operating temperature, making it impossible to resume production immediately after the cause of the temporary stoppage has been dealt with. Secondly, uneven heating would cause non homogeneous expansion, i.e., not symmetrical with respect to the rotation axis, of the embossing roller and also, in some cases, a risk of local overheating.

The uneven deformation would cause imbalances and vibrations of the embossing rollers once the embossing-laminating device resumes operation without preliminary homogenization of the temperature. These phenomena would cause poor quality embossing of the respective ply V1, V2, with the risk of producing waste. The uneven thermal deformations of the embossing rollers 4, 5 can also cause faults of the embossing-laminating device, or the need to reduce the production speed until a homogeneous temperature of the embossing rollers 4, 5 is once again reached.

To avoid or reduce these drawbacks, in stoppages in which the embossing-laminating device is expected to rapidly resume operation, it is useful to maintain each embossing roller 4, 5 heated to a suitable and homogeneous temperature on the whole of the circumferential extension of the embossing roller 4, 5.

To do so, it is useful to firstly decrease the power of the supply currents of the electromagnetic induction device 19, 20 as, when the embossing-laminating device 1 is not operating the removal of heat through absorption by the ply V1, V2 does not occur. In this case, the control unit 25, through the temperature control loop of the embossing roller 4, 5, automatically reduces the electromagnetic induction currents to maintain the surface temperature of the embossing roller 4, 5 constantly at the operating level.

Secondly, it is advisable to continue to rotate the heated embossing roller or each heated embossing roller 4, 5, so that the eddy currents induced by the electromagnetic induction device 19, 20 involve the whole of the embossing roller 4, 5, rather than only a portion thereof, so as to maintain the temperature of the embossing roller approximately constant in all points of the cylindrical surface thereof and avoid asymmetrical thermal deformations thereof.

To be able to maintain the embossing roller 4, 5 in rotation without breaking the ply V1, V2 wrapped around it, it is suitable to move the respective pressure roller 6, 7 away to a sufficient degree and optionally to reduce the tension of the ply V1, V2 wrapped around the pressure roller 6, 7 and around the embossing roller 4, 5.

In this way, the embossing roller 4, 5 can rotate at a speed lower than the operating speed, maintaining the ply V1, V2 wrapped around it, but stationary. The friction between the ply V1, V2 and embossing rollers 4, 5 is very low and does not create problems or breakage of the plies. Practically, with this procedure it is possible for the plies V1, V2 to slide on the outer surface of the embossing rollers 4, 5 without breaking.

An similar movement away from the embossing roller is imparted to the marrying roller 11, if the embossing roller 5 is heated.

To summarize, with the embossing-laminating device 1 stopped: 1) each pressure roller 6, 7 and marrying roller 11 (when present) is moved away from each heated embossing roller 4, 5 and the tension of the plies V1, V2 is reduced, so as to allow a relative sliding movement between ply V1, V2 and respective embossing roller 4, 5; 2) the heated embossing roller is maintained in rotation at low speed; and 3) the electromagnetic induction device 19, 20 is supplied with a power such as to maintain the temperature of the respective embossing roller 4, 5 approximately constant and equal to the operating temperature, or slightly lower, for example ¾ of the operating temperature, or in any case within a temperature range around the operating temperature, i.e., the embossing process temperature (settable according to the type of embossing process). For example, H being the value of the operating temperature, this range can be between the temperature values of H+H/4 and H−H/4.

Low rotation speed of the embossing roller 4, 5 can be meant as a speed of around one tenth of the operating speed of the embossing roller during the embossing step, and preferably of around one twentieth of the operating speed. For example, the tangential speed of the heated embossing roller 4, 5 can range from 0.5 m/min to 30 m/min.

Equally, when it is necessary to cool the heated embossing rollers 4, 5: 1) the pressure rollers 6, 7 and optionally the marrying roller 11 (if the embossing roller 5 is heated) are moved away from the respective embossing rollers so as to disengage the plies V1, V2 from the embossing rollers 4, 5 and reduce the tension of the plies V1, V2; 2) each heated embossing roller 4, 5 is maintained in rotation at low speed; and 3) the power supply of the electromagnetic induction device 19, 20 is switched off.

In this way, the low-speed rotation of the embossing roller 4, 5 allows the whole of its outer surface to gradually and repeatedly come into contact the cooling system 30 so as to reduce the cooling time and obtain uniform cooling on the whole of the surface of the roller.

The mutual movement of the pressure rollers 6, 7 and of the marrying roller 11 away from the respective embossing rollers 4, 5 can be obtained through the actuators A1, A2, A3, Similarly, when it is necessary to heat the embossing roller or rollers 4, 5 from room temperature to operating temperature: 1) the embossing roller is rotated at low speed; 2) the electromagnetic induction device 19, 20 is supplied with power. In this step, the ply V1, V2 may or may not be wrapped around the embossing roller 4, 5. In the case in which the ply V1, V2 is wrapped around the embossing roller 4, 5, it is preferable to keep the respective pressure roller 6, 7 and the marrying roller 11 open, i.e., not in contact with the embossing roller 4, 5 being heated and the ply in a stationary condition.

In addition to the operations to move the pressure rollers 6, 7 and optionally to move the marrying roller 11 away from the respective embossing roller 4, 5, it is useful to move the cliché roller 16 away from the embossing roller 5, so as to further reduce the pressure between the ply V2 and the embossing roller 5 and so as to avoid dispensing functional fluid when the embossing-laminating device 1 is not operating.

As mentioned, for brief stoppages, rotation of the embossing roller or rollers 4, 5 can be stopped and the respective electromagnetic induction devices 19, 20 can be deactivated. In this case, the thermal inertia of the respective heated embossing rollers is used to maintain the temperature sufficiently high during the temporary machine stoppage. The low thermal dissipation that occurs only slightly reduces the average temperature of the respective heated embossing roller.

In theory, the operations described above to obtain heating and cooling of the embossing rollers 4, 5 and maintain them at the desired temperature are only carried out for the heated embossing roller. In general, as mentioned, in fact, the embossing rollers 4, 5 can both be heated, or only one can be heated, while the other is not.

However, it has been found in practice that the measures described above to prevent drawbacks due to uneven heating or cooling of the embossing roller or of each embossing roller, with which the active electromagnetic induction device 19, 20 is associated, are not sufficient, i.e., if used alone, may not optimize the production process. Moreover, particular problems arise when one of the two embossing rollers is heated and the other is not.

In fact, the or each heated embossing roller is surrounded by one or more functional rollers. In the embodiment of FIG. 1, where both the embossing rollers 4, 5 are heated, the two pressure rollers 6, 7, the marrying roller 11 and the cliché roller 16 are functional rollers, according to the definition given in the introduction of the present description. It would also be possible for other functional rollers to be present around one or the other of the embossing rollers 4, 5. In fact, in some embossing-laminating units a single embossing roller can coact with more than one pressure roller, for example, because more than one ply of cellulose material is guided around the same embossing roller. An example of an embossing-laminating device of this type is disclosed in EP2353859. As clarified in greater detail with reference to further exemplary embodiments, one or more embossing rollers can also be functional rollers, when they are not heated.

During the normal operation of the embossing-laminating device 1, the functional rollers are rotating at a peripheral speed usually approximately equal to the peripheral speed of the heated embossing roller 4, 5, with which they are associated and hence to the linear speed of the ply V1 or V2.

However, in some steps, and in particular during the temporary stoppages described above, the functional rollers of the embossing or embossing-laminating devices of the prior art are usually stopped. Each functional roller that is adjacent (i.e., close) to an embossing roller 4, 5 which is maintained at the desired temperature by the electromagnetic induction device 19, 20, is heated as a result of convection and of radiation, receiving heat from the heated embossing roller 4, 5. This causes uneven heating of the functional roller: the portion of surface facing the heated embossing roller 4, 5 heats up, while the portion facing the opposite side tends to return to room temperature. This phenomenon also occurs in the case in which, for example, during a brief temporary stoppage, the heating device of the embossing roller is deactivated. In fact, the embossing rollers have a high thermal inertia and their temperature drops very slowly during stoppages, with consequent transfer of heat to the adjacent functional rollers.

As a result of this phenomenon, the functional roller becomes significantly deformed, or its mechanical properties are changed, and this can cause negative effects when the embossing-laminating device 1 is started up again, i.e. when production resumes.

Typically, the pressure rollers 6, 7, the marrying roller 11 and the cliché roller 16, and any other pressure or guide rollers coacting with one or other of the embossing rollers 4, 5 undergo an elongation or axial expansion in the area facing the heated embossing roller 4, 5 and a shortening on the opposite side, due to the temperature differential. This leads to a consequent deformation of the rotation axis. This causes vibrations and production defects in the initial step of resumption of production. For example, uneven expansions on the cliché roller 16 can cause non homogeneous or discontinuous contact with the embossing roller 5 causing defects in the dispensing of the functional liquid on the front surfaces of the embossing protrusions 4P, 5P.

The pressure rollers 6, 7 can suffer from these phenomena to a lesser extent, due to the thermal insulation effect of their coating made of rubber or another elastically yielding material. However, the difference in temperature reached by the coating can cause an uneven modification of the mechanical properties of the coating, for example of its hardness.

In order to avoid or reduce these drawbacks, according to embodiments disclosed herein, at least one of the functional rollers associated with at least one of the heated embossing rollers 4, 5 is kept in rotation also during the temporary stoppages, and optionally also during other transitory steps, for example in the initial heating step, or in the cooling step.

The rotation of one or more functional rollers during the temporary stoppage of the embossing device 1 can also take place for short periods, also if the respective heated embossing roller 4, 5 were to be maintained stationary and the heating device 19, 20 were to be maintained switched off during the period of temporary stoppage, in view of the high thermal inertia of the embossing roller, as mentioned above.

Preferably, the functional roller is maintained in rotation at low speed, for example at a speed of approximately 1/10 or 1/20 of the production speed or in general at a peripheral speed ranging from 0.5 m/min to 30 m/min.

The rotation can be continuous, at constant or variable speed, or can be discontinuous, i.e., intermittent.

The rotation of the functional roller causes the functional roller to receive an approximately uniform amount of heat on the whole of the cylindrical surface from the adjacent heated embossing roller 4, 5. In this way, uneven deformations and consequent deflections of the axis of rotation of the functional roller are avoided or greatly reduced. The temperature of at least one of the heated rollers that can be considered as a threshold above which to rotate one or more functional rollers can be 50° C., preferably 40° C.

This temperature can be maintained by supplying heat through the heating device of the heated embossing roller, for example if the stoppage is relatively long. In other cases, for example for short stoppages, the temperature of the heated embossing roller remains high (above 50° C., or above 40° C., for example) even without heating, i.e., with the heating device temporarily deactivated.

Instead of a continuous rotation at low speed, the functional roller can be kept in movement by means of an intermittent motion in order to avoid constantly exposing only one part of the roller to the heat, i.e., that part facing the heated roller. The intermittent movement can have a frequency that increases in proportion to the temperature of the heated roller. Intermittent movement is meant as a movement in a clockwise or counter-clockwise direction of rotation followed by a pause, i.e., by a period in which the roller is stopped. The period of movement and of stoppage can be the same or different.

It would also be possible to rotate the functional roller in alternate directions, clockwise and counter-clockwise, with suitable angles so as to heat approximately uniformly the whole of the cylindrical surface thereof.

As noted, this is useful, for example, for the pressure roller 6, 7. These rollers are in general rotated as a result of the friction between the surface of the pressure roller 6, 7 and the ply V1 or V2 wrapped around the corresponding embossing roller 4, 5. In other words, the pressure roller 6, 7 is rotated by the corresponding embossing roller 4, 5 against which it is pressed. As during the temporary stoppages or during the transitory steps described above, each pressure roller 6, 7 is maintained at a distance from the corresponding embossing roller 4, 5, it is advisable to provide an auxiliary rotation system for the pressure roller 6, 7. The auxiliary rotation system is configured to keep the respective pressure roller 6, 7 in rotation, when the pressure roller is distanced from the embossing roller 4, 5.

In some embodiments, to this end, a specific auxiliary motor M2, schematically shown in FIG. 1, can be provided for each pressure roller 6, 7. The auxiliary motor M2 can be coaxial to the respective pressure roller 6, 7, although this is not essential. In other embodiments, for example, the auxiliary motor M2 can be placed off-axis with respect to the pressure roller 6, 7 and can be used to control a belt, against which the pressure roller 6, 7, or a shaft supporting the pressure roller, can be pushed, so that the belt transmits a rotation motion to the pressure roller through friction.

In other embodiments, the pressure roller 6, 7 can be provided with cleaning systems, for example with cylindrical cleaning brushes. These can be motorized and brought into contact with the cylindrical surface of the pressure rollers 6, 7. The brushes in this case can serve to rotate the respective pressure rollers 6, 7.

Similar arrangements can be provided to rotate the marrying roller 11, which is also usually rotated through friction by the embossing roller 5. In FIG. 1, M3 schematically indicates an auxiliary motor that rotates the marrying roller 11. Also in this case, the motor M3 coaxial to the marrying roller 11 can be replaced by another type of drive, for example a peripheral drive, as described above for the pressure rollers 6, 7.

It would also be possible to use a single auxiliary motor to continuously or intermittently rotate more than one of the rollers 6, 7 and 11, for example with appropriate drive members such as gears, belts and pulleys.

The cliché roller 16 also forms a functional roller coacting with the embossing roller 5. Therefore, it suffers from the same drawbacks if the embossing roller 5 is heated. In order to alleviate this problem, the cliché roller can be kept in slow rotation during the transitory and temporary stoppage steps. To this end, a motor M4 can be used. The motor M4 can be associated with any one of the rollers of the functional fluid dispenser 13. In this way, the rollers 16 and 15 can be kept in simultaneous rotation. In general, the motor M4 is provided to positively operate the rollers of the dispenser 13 also during normal operation of the embossing-laminating device.

Figure 5:
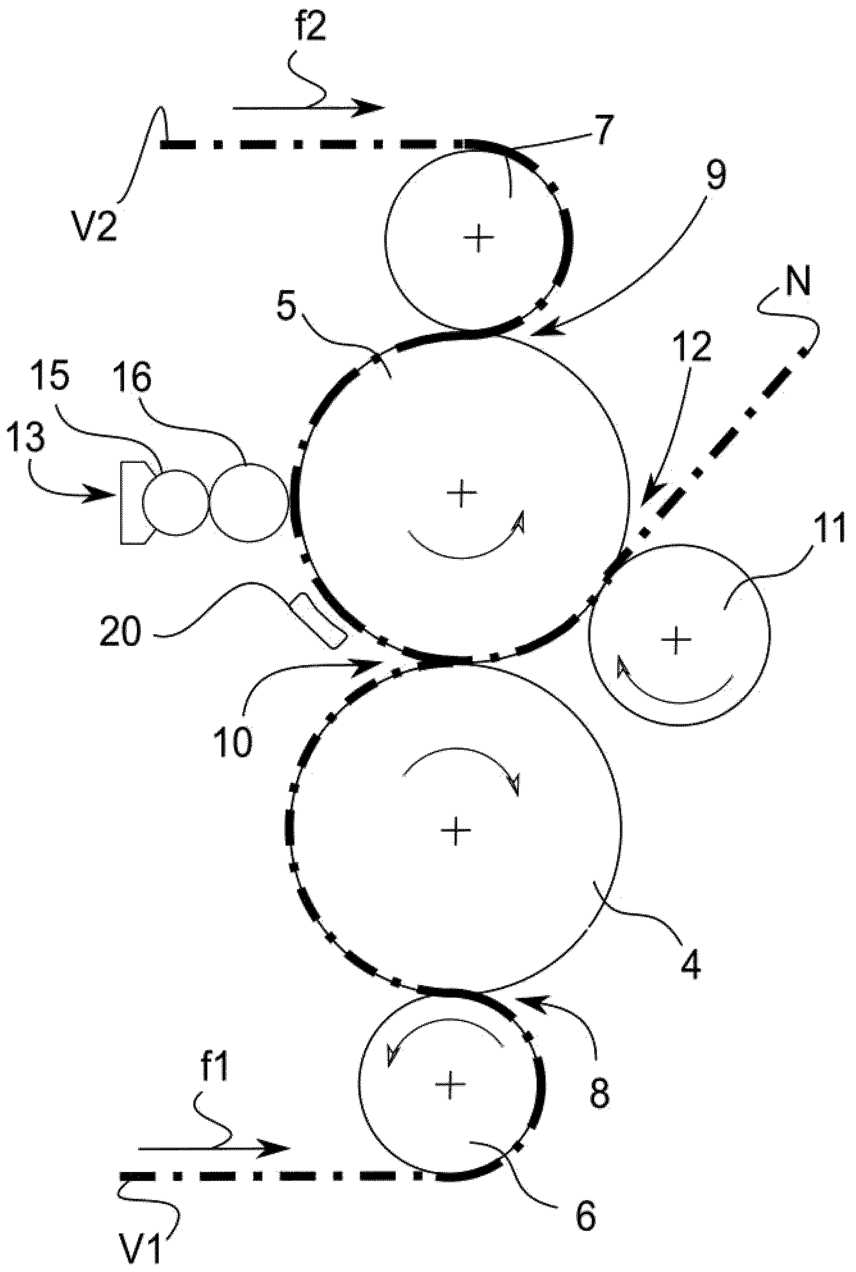

As mentioned above, the embossing device, or embossing-laminating device 1 can have a single heated embossing roller. This can be obtained by activating only one of the electromagnetic induction devices 19, 20, or by providing only one electromagnetic induction device. FIGS. 5 and 6 show two exemplary embodiments in which only one of the two embossing rollers 4, 5 is heated. The same numbers indicate equal or equivalent parts to those already described above with reference to FIG. 1, and which will not be described again.

In particular, FIG. 5 schematically shows an embossing-laminating device 1 in which only the embossing roller 5 is heated, circumstance pictorially represented by the fact that only electromagnetic induction device 20 is shown, while the other magnetic induction device 19 is omitted (or deactivated).

FIG. 6 schematically shows an embossing-laminating device 1 in which only the embossing roller 4 is heated, circumstance pictorially represented by the fact that only the electromagnetic induction device 19 is shown, while the other electromagnetic induction device 20 is omitted (or deactivated).

In the embodiment of FIG. 5, where the heated embossing roller is the roller 5, the embossing roller 4 represents a functional roller in the sense defined above. In fact, the embossing roller 4 rotates during the operation of the embossing device 1, is not heated by an own heating device, and carries out an action on a ply of cellulose fibers. It is adjacent to the heated embossing roller 5 and thus receives heat therefrom. The rollers 7, 15, 16, 11 are also functional rollers, as they receive heat directly from the heated embossing roller 5, as is the roller 6, since it receives heat indirectly from the heated embossing roller 5.

In the case of a short temporary stoppage, for example, the heated embossing roller 5 maintains its desired temperature due to thermal inertia thereof. It can remain stationary and the electromagnetic induction device 20 can be deactivated. Alternatively, the electromagnetic induction device 20 can be deactivated, and the embossing roller 5 can be maintained in rotation, preferably at low speed.

During this temporary stoppage step, the embossing roller 4, which represents a functional roller, is kept in rotation to avoid the generation of temperature gradients caused by the fact that the surface portion thereof facing the heated embossing roller 5 receives heat, while the remaining surface portion dissipates heat into the environment, or in any case does not receive any.

If the two embossing rollers 4, 5 are connected to a single motor, the rotation of the embossing roller 4 also causes the rotation of the embossing roller 5. Instead, if the two embossing rollers have independent motors, or are disengageable, the embossing roller 4 can be kept in rotation, to avoid or limit the occurrence of thermal gradients, and the heated embossing roller 5 can be stopped, as in any case it does not cool down excessively and is not heated by the electromagnetic induction device 20, which is deactivated.

One or more of the remaining functional rollers 7, 15, 16, 11, 6 can be kept in rotation, in the manner described above with reference to FIG. 1. Depending upon which functional rollers and embossing rollers are maintained in rotation, it will be necessary to mutually move the functional rollers away from the embossing rollers. For example, the pressure roller 6 is moved away from the embossing roller 4, to allow the latter to rotate while sliding on the surface of the ply V1. This movement also allows the pressure roller 6 to be kept in rotation. If the heated embossing roller 5 does not require to be kept in rotation, for example because the electromagnetic induction device 20 is deactivated temporarily, only one or another of the rollers 16, 7 and 11 that must be kept in rotation is moved away from the embossing roller 5.

For example, it can be useful or necessary to keep the marrying roller 11 in rotation, while it might not be necessary to keep the pressure roller 7 and the cliché roller 16 with the respective anilox roller 15 in rotation, or vice versa. In this case, the marrying roller 11 is moved away from the heated embossing roller 5, but the others are not, or vice versa.

If it is useful to keep the electromagnetic induction device 20 activated, for example because the stoppage period is relatively long, then the heated embossing roller 5 is kept in rotation to maintain the surface temperature uniform, with consequent sliding of the cylindrical surface thereof on the ply V2. In order to allow this rotation, all the rollers that coact mechanically (with contact) with the heated embossing roller 5, i.e., the marrying roller 11, the pressure roller 7 and the cliché roller 16 with the respective anilox roller 15, are moved away therefrom.

In the embodiment of FIG. 6, where the heated embossing roller is roller 4, the embossing roller 5 represents a functional roller in the sense defined above. The roller 6 that receives heat directly from the heated embossing roller 4 is a functional roller. Finally, also the rollers 7, 15, 16, 11 are functional rollers, as they receive heat indirectly from the heated embossing roller 4 through the transfer of heat from the embossing roller 4 to the embossing roller 5.

In the case of a brief temporary stoppage, for example, the heated embossing roller 4 remains at the desired temperature due to its thermal inertia. It can remain stationary and the electromagnetic induction device 19 can be deactivated. Alternatively, the electromagnetic induction device 19 can be deactivated, and the embossing roller 4 can in any case be maintained in rotation, preferably at low speed.

During this temporary stoppage step, the embossing roller 5, which forms the functional roller, is kept in rotation to avoid the generation of temperature gradients caused by the fact that the portion of surface facing the heated embossing roller 4 receives heat, while the remaining portion of surface dissipates heat into the environment, or in any case does not receive any heat.

If the two embossing rollers 4, 5 are connected to a single motor, the rotation of the embossing roller 4 also causes the rotation of the embossing roller 5. Instead, if the two embossing rollers have independent motors, or are disengageable, the embossing roller 5 can be kept in rotation and the heated embossing roller 4 can be kept stationary.

The functional rollers 7, 11, 16 must be moved away from the embossing roller 5 to allow it to be kept in rotation while sliding on the ply V2, which is stationary. One or more of the rollers 7, 15, 16, 11 can in turn be kept in rotation for the reasons described above. The pressure roller 6 can be moved away from the heated embossing roller 4 and kept in rotation, or maintained stationary. Alternatively, if the heated embossing roller 4 is stationary, the pressure roller 6 can be kept stationary (not rotating) and in contact with the ply V1 wrapped around the heated embossing roller 4, if the temperature of the latter is not as high as to damage the ply V1.

If it is useful to keep the electromagnetic induction device 19 active, for example because the stoppage period is relatively long, then the heated embossing roller 4 is kept in rotation to maintain the surface temperature thereof uniform, with consequent sliding of its cylindrical surface on the ply V1. In order to allow this rotation, the pressure roller 6 is kept spaced from the embossing roller 4 and can optionally be kept in rotation, as one or the other of the remaining functional rollers.

The embodiments described above relate to a type of embossing-laminating device that has been taken as a non-limiting example of the invention. In fact, those skilled in the art are aware of the existence of many different types of embossing-laminating devices that can vary in the number of embossing rollers, in their arrangement and naturally in the type of treatment carried out on the paper plies, wherein the above disclosed novel features can be embodied, without departing from the principles, the concepts and teachings of the present invention. For example, the invention is also applicable to an embossing device comprising only one embossing roller and respective pressure roller, and which thus does not require a ply bonding device, or to an embossing-laminating device having a larger number of embossing rollers and/or of paths for the plies of web material.

Moreover, the embodiments described above refer to an electromagnetic induction heating device of the embossing roller 4, 5, external to the embossing roller, and which requires a rotation of the embossing roller to obtain uniform heating. For the many reasons set forth above, an induction heating of this type is preferable to other known heating systems. In particular, induction heating avoids the need for complex circuits for a heat transfer fluid. Induction heating through a system placed externally to the embossing roller and in a position such as to induce eddy currents only in a portion of the embossing roller is particularly simple and is small in size, and is also suitable to induce eddy currents in the outer surface area of the embossing roller, where it is more useful for the generation of heat to concentrate.

However, at least some of the difficulties described above deriving from the use of one or more heated embossing rollers are also found when heating takes place through other heating means, for example means that are able to obtain an approximately uniform temperature also in a non-rotating embossing roller.

In particular, the risk of uneven heating of the functional rollers adjacent to the heated embossing roller can also occur when the embossing roller is heated homogeneously, for example through a heat transfer fluid, such as a diathermic oil or the like, or through an induction system that induces approximately homogeneous eddy currents in the whole of the embossing roller. In these cases, the uniform heating of the heated embossing roller is obtained even without keeping the embossing roller in rotation.

However, also in this case, the functional rollers adjacent to the heated embossing roller 4, 5 (pressure rollers 6, 7, marrying roller 11, cliché roller 16), if not kept in rotation, become unevenly heated, through convection and/or radiation, due to the closeness to the heated embossing roller 4, 5, even if the latter is stationary. To avoid this phenomenon, one or more of the functional rollers are maintained in rotation during phases of temporary stoppage of the embossing-laminating device 1, while the embossing rollers 4, 5 remain stationary, due to the fact that the heating system used generates a uniform heating of the embossing roller even without it being maintained in rotation.

The rotation can in general be imparted to one or more of the functional rollers that coact with the heated embossing roller. While in the description above the pressure rollers 6, 7, the marrying roller 11 and the cliché roller 16 were kept rotating slowly, in other embodiments only some or only one of these functional rollers can be kept in rotation, based on the specific needs of the embossing device, which can be determined, for example, by the type of embossing, by the material the rollers are made of, by the operating temperatures used, or by other parameters.

It would also be possible to adopt one or more of the features described above in a simple embossing device, which comprises only one embossing roller and only one pressure roller, in which the single embossing roller is heated. FIG. 7 shows an exemplary embodiment of this type, in which the single embossing roller is labeled 5 and is associated with a heating device, represented here by an electromagnetic induction device 20. The single embossing roller coacts with a respective pressure roller 6, for example with an outer coating made of elastically yielding material. If necessary, during the transitory steps described above, for example during a stoppage in production, feed of the ply of cellulose fibers V stops temporarily, and the pressure roller 6 can be moved away from the heated embossing roller 5. The pressure roller 6, which here represents the only functional roller, is maintained in rotation, preferably at low speed, without interfering with the ply V. The heated embossing roller 5 can be kept stationary and the electromagnetic induction device 20 can be kept deactivated, if the stoppage step is short. Instead, if the stoppage step is sufficiently long for it to be advisable to avoid an excessive cooling of the heated embossing roller 5, the latter is kept in rotation, preferably at low speed, while the electromagnetic induction device is kept activated. The embossing roller 5 slides on the ply V that remains stationary.

If heating takes place in a different way, for example with a heat transfer fluid, or with an induction system that heats the whole cylindrical extension of the embossing roller 5, the supply of heat can be obtained even without rotation of the embossing roller 5. This is also the case in the previous embodiments for each of the heated embossing rollers 4, 5, if heating takes place uniformly.

Summarizing, in general terms, there is described a method for the management of temporary stoppages of an embossing device, in which at least one of the embossing rollers is at a temperature higher than room temperature, wherein the method comprises the following steps:

- moving at least one functional roller, in particular each pressure roller 6, 7, the marrying roller 11 and the cliché roller 16, away from the respective embossing rollers 4, 5;
- maintaining at least one, some or preferably all the functional rollers adjacent to a respective heated embossing roller 4, 5 in rotation.

As can be understood from the description above, when the embossing device comprises several embossing rollers, the embossing roller or those embossing rollers that is/are not heated, is/are in turn a functional roller with respect to the heated embossing roller.

The method can comprise the step of supplying heat to each heated embossing roller during the stoppage step, for example if this step lasts for a relatively long period with respect to the thermal inertia of the heated embossing roller.

Preferably, when an embossing roller is heated during the stoppage step to maintain it at the desired temperature, it is kept at a temperature preferably approximately equal to the operating temperature, i.e., the temperature at which the embossing roller is kept during production of the embossed web material, or slightly below the operating temperature, for example ¾ of the operating temperature, or in any case within a temperature range around the operating temperature.

Specifically, when the heating device is an electromagnetic induction device that induces eddy currents in a portion of the heated embossing roller, and heat must be supplied to the heated embossing roller during the stoppage step, the method can include the following steps:

moving at least one functional roller, in particular each pressure roller 6, 7, the marrying roller 11 and the cliché roller 16, away from each respective heated embossing roller 4, 5 and reducing the tension of the plies V1, V2, so as to allow a relative sliding movement between ply V1, V2 and respective heated embossing roller 4, 5;

maintaining in rotation, preferably at low speed, the heated embossing roller 4, 5;

maintaining in rotation at least one, some or all the functional rollers adjacent to a respective heated embossing roller 4, 5; and supplying the electromagnetic induction device 19, 20 with a power such as to maintain the respective embossing roller 4, 5 at the desired temperature, preferably at a temperature equal to or lower than the operating temperature, as indicated above.

When it is necessary to cool the heated embossing rollers 4, 5 the following steps can be carried out:

moving the functional rollers, i.e., the pressure rollers 6, 7 and optionally the marrying roller 11 and the cliché roller 16 (if the embossing roller 5 is heated), away from the respective embossing rollers so as to disengage the plies V1, V2 from the embossing rollers 4, 5;

maintaining one or more of the functional rollers rotating slowly; and reducing the temperature of the or of each embossing roller 4, 5.

When the heating device is an electromagnetic induction device, the following steps can be carried out:

moving the functional rollers, i.e., the pressure rollers 6, 7 and optionally the marrying roller 11 and the cliché roller 16 (if the embossing roller 5 is heated), away from the respective embossing rollers so as to disengage the plies V1, V2 from the embossing rollers 4, 5 and reduce the tension of the plies V1, V2;

maintaining each heated embossing roller 4, 5 in rotation at low speed;

maintaining one or more of the functional rollers rotating slowly;

and switching off the power supply of the electromagnetic induction device 19, 20.

Similarly, when it is necessary to heat the embossing roller or rollers 4, 5 from room temperature to operating temperature it is possible to:

rotate the or each functional roller associated with each embossing roller to be heated 4, 5 at low speed; and gradually heat the or each embossing roller 4, 5.

When the embossing roller or rollers is/are heated through an electromagnetic induction device, the heating method can comprise the following steps:

rotating the or each embossing roller to be heated 4, 5 at low speed;

rotating the or each functional roller associated with each embossing roller to be heated 4, 5 at low speed; and powering the electromagnetic induction device 19, 20.

In this step, the ply V1, V2 may or may not be wrapped around the embossing roller 4, 5. In the case in which the ply V1, V2 is wrapped around it, it is preferable to keep the respective pressure roller 6, 7 and the marrying roller 11 open, i.e., not in contact with the embossing roller 4, 5 being heated.

The invention claimed is:

1. An embossing device comprising:

a first path for a first ply of web material;

along the first path, a first embossing roller with embossing protrusions;

a first heating device associated with the first embossing roller to heat a surface of the first embossing roller;

at least one first functional roller adapted to perform an action on a ply of web material;

a control unit;

wherein the at least one first functional roller is provided with a rotation arrangement, adapted to keep the at least one first functional roller in rotation during a temporary stoppage of the embossing device, with said at least one first functional roller being spaced from the first embossing roller and with the first ply of web material being stationary in the first path; and wherein the control unit is configured to control the rotation arrangement such that the at least one first functional roller is maintained in rotation during the temporary stoppage of the embossing device.

2. The embossing device of claim 1, wherein the control unit is further configured to keep the at least one first functional roller continuously or discontinuously in rotation, at a speed lower than speed of the rotation of the at least one first functional roller in production conditions of the embossing device.

3. The embossing device of claim 1, wherein said at least one first functional roller is selected from a group including a pressure roller, a cliché roller of a dispenser of a functional fluid, a marrying roller, a further embossing roller, and combinations thereof.

4. The embossing device of claim 1, further comprising:

a second path for a second ply of web material;

along the second path, a second embossing roller with embossing protrusions;

at least one second functional roller adapted to perform an action on the second ply of web material and adapted to take a first position of contact with the second embossing roller and a second position spaced from the second embossing roller.

5. The embossing device of claim 4, further comprising a second heating device associated with the second embossing roller to heat a surface of the second embossing roller.

6. The embossing device of claim 4, wherein said at least one second functional roller is selected from a group including a pressure roller, a cliché roller of a dispenser of a functional fluid, a marrying roller, a further embossing roller, and combinations thereof.

7. The embossing device of claim 1, wherein said first heating device is an electromagnetic induction heating device, and wherein said electromagnetic induction heating device is placed externally to said first embossing roller.

8. The embossing device of claim 1, wherein the at least one first functional roller comprises an auxiliary motor to control rotation of the at least one first functional roller during the temporary stoppage of the embossing device.

9. A method for managing a temporary stoppage of an embossing device comprising a first path for a first ply of web material; along the first path, a first embossing roller provided with embossing protrusions; a first heating device associated with the first embossing roller to heat a surface of said first embossing roller, and at least one first functional roller adapted to perform an action on a ply of web material; wherein the method comprises steps as follows:

maintaining the first ply of web material substantially stationary along the first path;

rotating said at least one first functional roller, and maintaining a substantially uniform surface temperature of said at least one first functional roller, while the first embossing roller is at a temperature higher than the temperature of the at least one first functional roller.

10. The method of claim 9, further comprising keeping said at least one first functional roller continuously or discontinuously in rotation at a speed lower than a production speed of the embossing device.

11. The method of claim 9, wherein said at least one first functional roller is selected from a group including a pressure roller, a cliché roller of a dispenser of a functional fluid, a marrying roller, a further embossing roller, and combinations thereof.

12. The method of claim 9, further comprising moving said at least one functional roller away from the first embossing roller.

13. The method of claim 9, further comprising heating the first embossing roller during the temporary stoppage by the first heating device, said first heating device being an induction device positioned externally to the first embossing roller.

14. The method of claim 9, further comprising rotating the first embossing roller during the temporary stoppage of the embossing device.

15. The method of claim 9, wherein the embossing device further comprises: a second path for a second ply of web material; along the second path, a second embossing roller, provided with embossing protrusions; at least one second functional roller adapted to perform an action on a ply of web material and adapted to take a first position of contact with the second embossing roller and a second position spaced from the second embossing roller; and maintaining the second ply of web material substantially stationary along the second path.

16. The method of claim 15, wherein said at least one second functional roller is selected from a group including a pressure roller, a cliché roller of a dispenser of a functional fluid, a marrying roller, a further embossing roller, and combinations thereof.

17. The method of claim 15, further comprising keeping said at least one second functional roller continuously or discontinuously in rotation at a speed lower than a production speed of the embossing device.

18. The method of claim 9, wherein said first heating device is an electromagnetic induction heating device; and wherein the method further comprises maintaining, during the temporary stoppage, said first embossing roller with which the heating device is associated in rotation at a heating speed, lower than a production speed of the embossing device, the first embossing roller sliding on said first ply of web material wrapped around the first embossing roller and maintained stationary along said first path.

19. The method of claim 18, further comprising slackening tension of the first ply of web material guided around said first embossing roller to facilitate rotation of the first embossing roller in conditions of sliding on the first ply of web material wrapped around the first embossing roller.

20. A method for managing a temporary stoppage of an embossing device comprising a first path for a first ply of web material; along the first path, a first embossing roller provided with embossing protrusions; a first pressure roller defining with the first embossing roller a first embossing nip, through which the first ply of web material passes; a second path for a second ply of web material; along the second path, a second embossing roller, provided with embossing protrusions; a second pressure roller defining with the second embossing roller a second embossing nip, through which the second ply of web material passes; a first heating device configured to heat a surface of the first embossing roller;

wherein the method comprises steps as follows:

maintaining the first ply of web material substantially stationary along the first path and the second ply of web material substantially stationary along the second path;

moving the second pressure roller away from the second embossing roller;

rotating the second embossing roller to maintain a substantially uniform surface temperature of said second embossing roller, while temperature of the first embossing roller is higher than the temperature of the second embossing roller, the second embossing roller sliding on the second ply of web material.

21. The method of claim 20, further comprising maintaining the first embossing roller at a pre-determined temperature by the first heating device.

22. The method of claim 20, further comprising moving the first pressure roller away from the first embossing roller and maintaining the first embossing roller in rotation in conditions of sliding on the first ply of web material.

23. The method of claim 20, wherein an applicator of functional liquid comprising a cliché roller is associated with one of said first embossing roller and said second embossing roller; and wherein the method further comprises moving the cliché roller away from a respective one of said first embossing roller and said second embossing roller during the temporary stoppage.

24. The method of claim 23, further comprising maintaining the cliché roller in rotation during the temporary stoppage.

25. The method of claim 20, wherein the embossing device further comprises a marrying roller defining with one of said first embossing roller and said second embossing roller a marrying nip for bonding the first ply of web material and the second ply of web material to each other.

26. The method of claim 25, further comprising maintaining the marrying roller spaced from a respective one of said first embossing roller and said second embossing roller, and in rotation, during the temporary stoppage.

27. An embossing device comprising:

a first path for a first ply of web material;

along the first path, a first embossing roller provided with embossing protrusions;

a first pressure roller defining with the first embossing roller a first embossing nip, through which the first ply of web material passes;

a second path for a second ply of web material;

along the second path, a second embossing roller, provided with embossing protrusions;

a second pressure roller defining with the second embossing roller a second embossing nip, through which the second ply of web material passes;

a first heating device adapted to heat a surface of the first embossing roller;

wherein the second embossing roller is combined with a rotation arrangement configured to maintain the second embossing roller in rotation during a step of temporary 1 stoppage of the embossing device, with the second ply of web material and the first ply of web material stationary in a respective one of said first path and said second path, the second pressure roller spaced from the second embossing roller and the first embossing roller at a temperature higher than room temperature; and wherein the rotation arrangement is controlled to rotate the first embossing roller and the second embossing roller during the step of temporary stoppage of the embossing device.

28. The embossing device of claim 27, wherein the first heating device is controlled to heat the first embossing roller during the step of temporary stoppage.

29. The embossing device of claim 28, wherein the first embossing roller is controlled to rotate during the step of temporary stoppage, with the first pressure roller spaced from the first embossing roller.

30. The embossing device of claim 27, wherein at least one of said first pressure roller and said second pressure roller is controlled to rotate during the step of temporary stoppage.

31. The embossing device of claim 27, further comprising a marrying roller defining a marrying nip with one of said first embossing roller and said second embossing roller.

32. The embossing device of claim 31, wherein the marrying roller is controlled to be spaced from a respective one of said first embossing roller and said second embossing roller and rotate during the step of temporary stoppage.

33. The embossing device of claim 27, further comprising a cliche roller adapted to apply a functional fluid to one of said first ply of web material and said second ply of web material; and wherein the cliché roller is controlled to move away from a respective one of said first embossing roller and said second embossing roller in the step of temporary stoppage and to rotate during the step of temporary stoppage.

* * * * *